United States Patent
Yates et al.

(10) Patent No.: US 9,562,581 B2
(45) Date of Patent: Feb. 7, 2017

(54) SPRING TENSION ADJUSTMENT MECHANISM

(71) Applicant: Bell Helicopter Textron Inc., Fort Worth, TX (US)

(72) Inventors: Travis Yates, Lakeside, TX (US); Chad Haugeberg, Arlington, TX (US)

(73) Assignee: Bell Helicopter Textron Inc., Fort Worth, TX (US)

( * ) Notice: Subject to any disclaimer, the term of this patent is extended or adjusted under 35 U.S.C. 154(b) by 219 days.

(21) Appl. No.: 14/467,968

(22) Filed: Aug. 25, 2014

(65) Prior Publication Data

US 2015/0275998 A1    Oct. 1, 2015

Related U.S. Application Data

(60) Provisional application No. 61/971,768, filed on Mar. 28, 2014.

(51) Int. Cl.
| | |
|---|---|
| *B64C 27/00* | (2006.01) |
| *F16F 1/12* | (2006.01) |
| *B64C 13/04* | (2006.01) |
| *B64C 13/12* | (2006.01) |
| *B64C 13/30* | (2006.01) |
| *B64D 43/00* | (2006.01) |

(52) U.S. Cl.
CPC ............... *F16F 1/121* (2013.01); *B64C 13/04* (2013.01); *B64C 13/12* (2013.01); *B64C 13/30* (2013.01); *B64D 43/00* (2013.01)

(58) Field of Classification Search
CPC .......... F16F 1/121; B64C 13/04; B64C 13/12; B64C 13/30; B64D 43/00
See application file for complete search history.

(56) References Cited

U.S. PATENT DOCUMENTS

| | | | | | |
|---|---|---|---|---|---|
| 4,170,147 | A | * | 10/1979 | Durno | B64C 13/30 244/233 |
| 4,198,877 | A | * | 4/1980 | Huling | B64C 13/30 244/232 |
| 4,776,543 | A | * | 10/1988 | Stableford | B64C 13/30 244/232 |
| 5,503,040 | A | * | 4/1996 | Wright | B64C 13/04 244/236 |
| 5,782,436 | A | * | 7/1998 | Pohling | B64C 13/12 244/224 |
| 6,644,600 | B1 | * | 11/2003 | Olson | B64C 13/04 244/221 |
| 7,559,510 | B1 | * | 7/2009 | Bae | B64C 13/46 244/223 |
| 7,784,772 | B2 | * | 8/2010 | Knopp | F16F 9/0218 267/175 |

(Continued)

FOREIGN PATENT DOCUMENTS

EP        0030521 A1 *  6/1981  ............ B60C 27/10

*Primary Examiner* — Brian M O'Hara
*Assistant Examiner* — Assres H Woldemaryam

(57) ABSTRACT

According to one embodiment, a spring tension adjustment device for adjusting tension in a spring includes a rotation feature and a plurality of spring-attachment features. The rotation feature defines a first axis of rotation. Each spring-attachment feature is configured to receive one end of a spring, each spring-attachment feature being located at a different distance from the rotation feature.

20 Claims, 6 Drawing Sheets

(56) References Cited

U.S. PATENT DOCUMENTS

2010/0044500 A1* 2/2010 Oyama ................. B64C 25/50
 244/50
2013/0256462 A1* 10/2013 Antraygue ............ G05G 9/047
 244/221

* cited by examiner

SPRING TENSION ADJUSTMENT MECHANISM

RELATED APPLICATIONS

Pursuant to 35 U.S.C. §119 (e), this application claims priority to U.S. Provisional Patent Application Ser. No. 61/971,768, entitled Spring Tension Adjustment Mechanism, filed Mar. 28, 2014. U.S. Provisional Patent Application Ser. No. 61/971,768 is hereby incorporated by reference.

TECHNICAL FIELD

This invention relates generally to aircraft flight control systems, and more particularly, to a spring tension adjustment mechanism.

BACKGROUND

A rotorcraft may include one or more rotor systems. One example of a rotorcraft rotor system is a main rotor system. A main rotor system may generate aerodynamic lift to support the weight of the rotorcraft in flight and thrust to counteract aerodynamic drag and move the rotorcraft in forward flight. Another example of a rotorcraft rotor system is a tail rotor system. A tail rotor system may generate thrust in the same direction as the main rotor system's rotation to counter the torque effect created by the main rotor system.

SUMMARY

Particular embodiments of the present disclosure may provide one or more technical advantages. A technical advantage of one embodiment may include the capability to adjust tension of a spring in a confined area. A technical advantage of one embodiment may include the capability to provide fine adjustment resolution in a positively-locked assembly with minimal hardware.

Certain embodiments of the present disclosure may include some, all, or none of the above advantages. One or more other technical advantages may be readily apparent to those skilled in the art from the figures, descriptions, and claims included herein.

BRIEF DESCRIPTION OF THE DRAWINGS

To provide a more complete understanding of the present invention and the features and advantages thereof, reference is made to the following description taken in conjunction with the accompanying drawings, in which.

DETAILED DESCRIPTION OF THE DRAWINGS

Figure 1A:
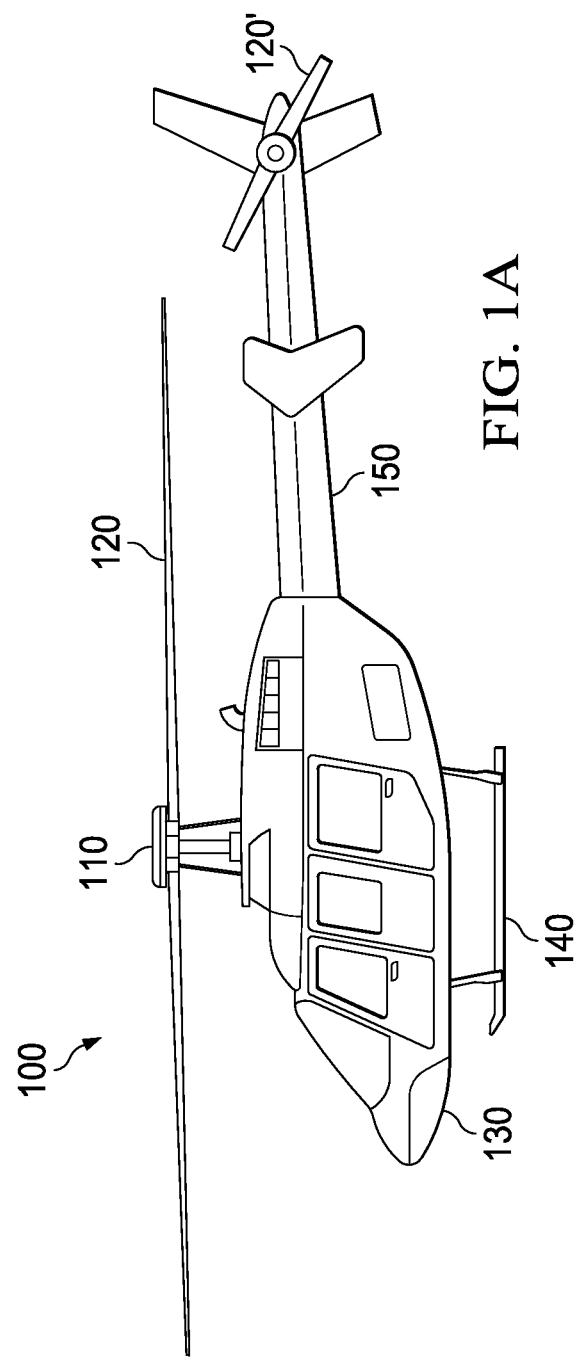
FIG. 1A shows a rotorcraft according to one example embodiment.

FIG. 1A shows a rotorcraft 100 according to one example embodiment. Rotorcraft 100 features a rotor system 110, blades 120, a fuselage 130, a landing gear 140, and an empennage 150. Rotor system 110 may rotate blades 120. Rotor system 110 may include a control system for selectively controlling the pitch of each blade 120 in order to selectively control direction, thrust, and lift of rotorcraft 100. Fuselage 130 represents the body of rotorcraft 100 and may be coupled to rotor system 110 such that rotor system 110 and blades 120 may move fuselage 130 through the air. Landing gear 140 supports rotorcraft 100 when rotorcraft 100 is landing and/or when rotorcraft 100 is at rest on the ground. Empennage 150 represents the tail section of the aircraft and features components of a rotor system 110 and blades 120'. Blades 120' may provide thrust in the same direction as the rotation of blades 120 so as to counter the torque effect created by rotor system 110 and blades 120. Teachings of certain embodiments relating to rotor systems described herein may apply to rotor system 110 and/or other rotor systems, such as other tilt rotor and helicopter rotor systems. It should also be appreciated that teachings from rotorcraft 100 may apply to aircraft other than rotorcraft, such as airplanes and unmanned aircraft, to name a few examples.

A pilot may manipulate one or more pilot flight controls in order to achieve controlled aerodynamic flight. Inputs provided by the pilot to the pilot flight controls may be transmitted mechanically and/or electronically (e.g., via a fly-by-wire flight control system) to flight control devices. Flight control devices may represent devices operable to change the flight characteristics of the aircraft. Examples of flight control devices on rotorcraft 100 may include the control system operable to change the positions of blades 120 and blades 120'.

Figure 1B:
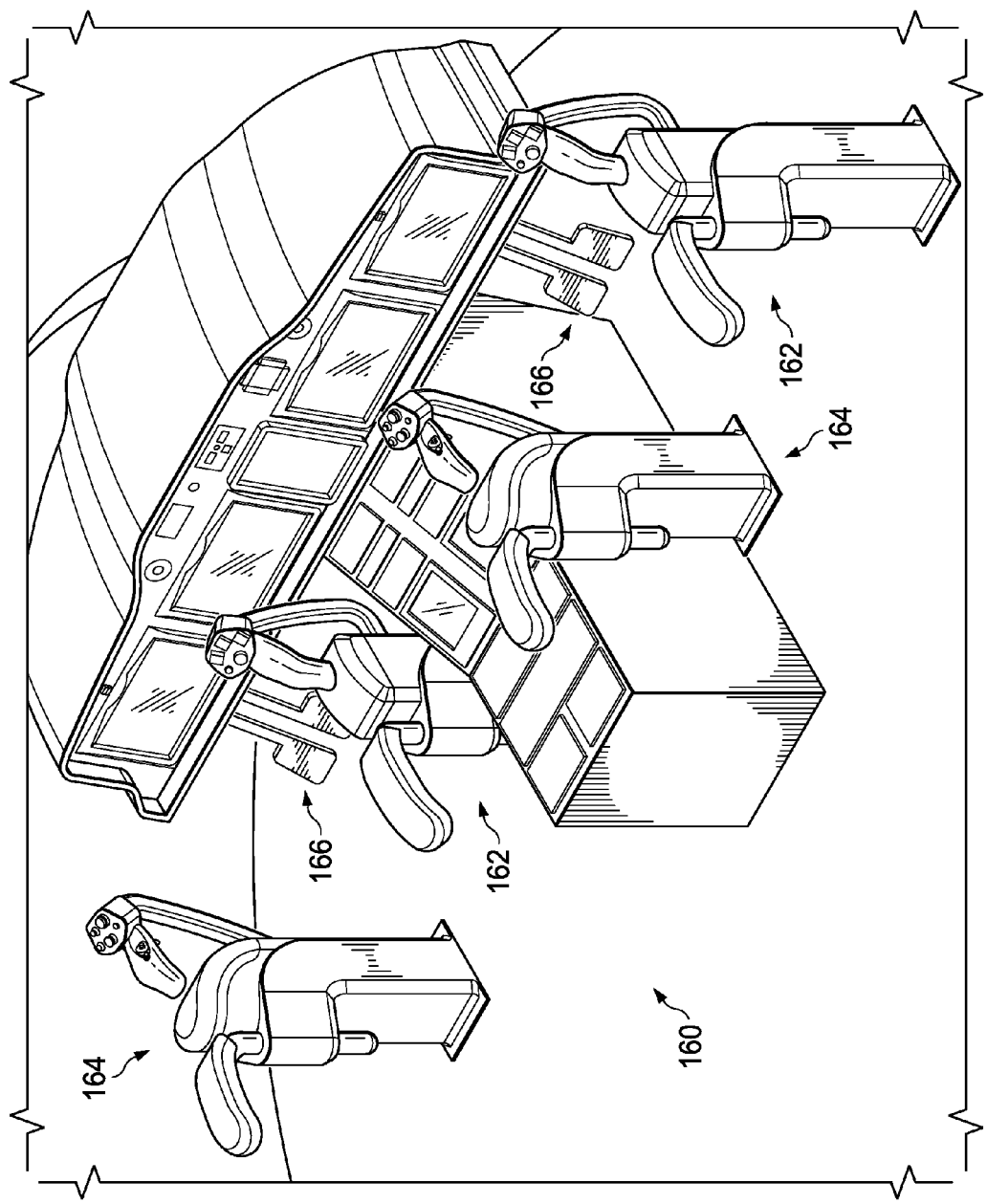
FIG. 1B shows a cockpit configuration of the rotorcraft of FIG. 1A according to one example embodiment.

FIG. 1B shows a cockpit configuration 160 of rotorcraft 100 according to one example embodiment. In the example of FIG. 1B, rotorcraft 100 features at least three sets of pilot flight controls: cyclic control assemblies 162, collective control assemblies 164, and pedal assemblies 166. In the example of FIG. 1B, a set of each pilot flight control is provided for a pilot and a co-pilot (both of which may be referred to as a pilot for the purposes of this discussion).

In general, cyclic pilot flight controls may allow a pilot to impart cyclic motions on blades 120. Cyclic motions in blades 120 may cause rotorcraft 100 to tilt in a direction specified by the pilot. For tilting forward and back (pitch) and/or tilting sideways (roll), the angle of attack of blades 120 may be altered cyclically during rotation, creating different amounts of lift at different points in the cycle.

Collective pilot flight controls may allow a pilot to impart collective motions on blades 120. Collective motions in blades 120 may change the overall lift produced by blades 120. For increasing or decreasing overall lift in blades 120, the angle of attack for all blades 120 may be collectively altered by equal amounts at the same time resulting in ascents, descents, acceleration, and deceleration.

Anti-torque pilot flight controls may allow a pilot to change the amount of anti-torque force applied to rotorcraft 100. As explained above, blades 120' may provide thrust in the same direction as the rotation of blades 120 so as to counter the torque effect created by rotor system 110 and blades 120. Anti-torque pilot flight controls may change the amount of anti-torque force applied so as to change the heading of rotorcraft 100. For example, providing anti-torque force greater than the torque effect created by rotor system 110 and blades 120 may cause rotorcraft 100 to rotate in a first direction, whereas providing anti-torque force less than the torque effect created by rotor system 110 and blades 120 may cause rotorcraft 100 to rotate in an opposite direction. In some embodiments, anti-torque pilot flight controls may change the amount of anti-torque force applied by changing the pitch of blades 120', increasing or reducing the thrust produced by blades 120' and causing the nose of rotorcraft 100 to yaw in the direction of the applied pedal. In some embodiments, rotorcraft 100 may include additional or different anti-torque devices (such as a rudder or a NOTAR anti-torque device), and the anti-torque pilot flight controls may change the amount of force provided by these additional or different anti-torque devices.

In the example of FIG. 1B, each cyclic control assembly 162 is located to the right of a pilot seat, each collective control assembly 164 is located to the left of a pilot seat, and pedal assembly 166 is located in front of a pilot seat. Teachings of certain embodiments recognize that cyclic control assemblies 162, collective control assemblies 164, and pedal assemblies 166 may be located in any suitable position.

Pilot flight controls (such as cyclic control assemblies 162, collective control assemblies 164, and pedal assemblies 166) may transmit flight inputs received from the pilot to flight control devices in variety of manners, including mechanically and/or electronically (e.g., via a fly-by-wire flight control system). Even electronic flight control systems, such as fly-by-wire systems, include at least some mechanical linkages. For example, in the cockpit configuration 160 of FIG. 1B, the pilot hand grips are mechanical devices that are mechanically linked to one or more linkages within the associated pilot flight control devices, and these linkages are in mechanical communication with devices that convert mechanical movement into electrical signals (e.g., position measurement devices such as rotary variable differential transformers). In the example of FIG. 1B, the position measurement devices are not shown in cockpit configuration 160 because they are hidden underneath the floorboard.

Regardless of what type of flight control system is used, mechanical devices operating within the flight control system may require some rigging and/or balancing. For example, in cockpit configuration 160, the pilot grips may be rigged such that their neutral resting position resides over their respective handrests (as shown in FIG. 1B). Without such rigging, each pilot grip would succumb to gravity and descend to an unfortunate final resting place. Teachings of certain embodiments recognize the capability to avoid such a tragic outcome.

Figure 2:
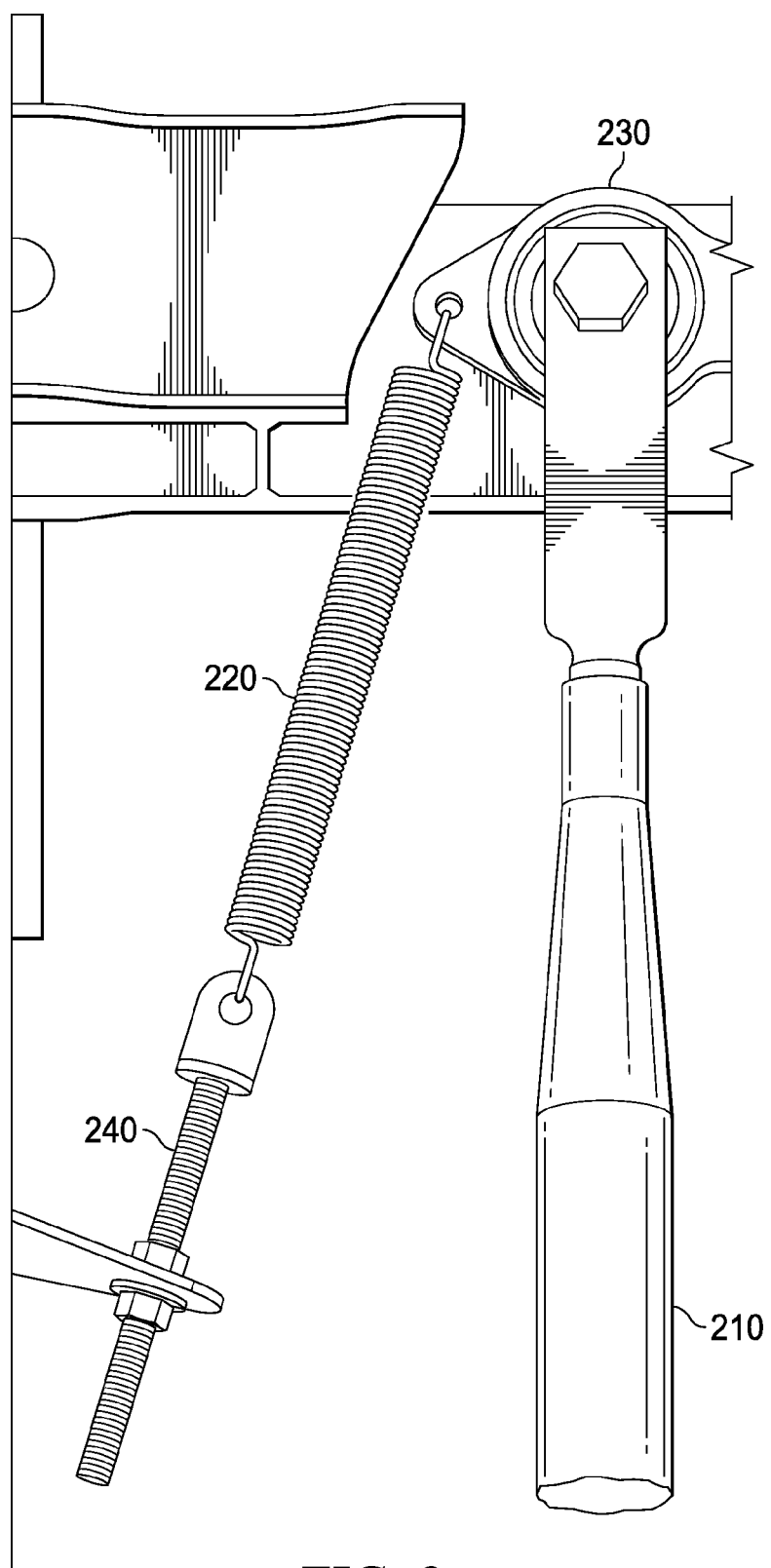
FIG. 2 shows a rigging system featuring a long eyebolt with jam nut that may be used for spring adjustment.

For example, FIG. 2 shows a rigging system 200. In the example of rigging system 200, linkage 210 is rigged using a spring 220 positioned between a rigging member 230 and a turn buckle assembly 240. In this arrangement, a long eyebolt with jam nut may be used for spring adjustment. The eyebolt is adjusted to give the desired spring tension. This method gives fine adjustment resolution but may require the addition of a locking pin after adjustment to provide a positively-locked assembly. A positively-locked assembly could be provided without additional hardware by providing multiple holes/hooks arranged linearly in series (e.g., along a single line), but adjustment resolution is limited by hook geometry and hole/hook spacing and may only be able to provide for coarse adjustment without additional hardware.

Some circumstances, however, may require positive locking and finer adjustment resolution than the example of FIG. 2. For example, example, mechanical linkages in fly-by-wire flight control systems should be precisely balanced to minimize stick breakout. Because of part tolerances, system imbalance may vary from ship to ship. In some aircraft, the balancing spring travel is very small (approx 0.8") and the force required is large (up to approx. 5 lbs). In such aircraft, fine adjustments may be necessary to achieve a precisely balanced system, and such adjustments should be positively-locked in some manner to withstand the large forces.

In addition, in some aircraft, the springs are located in control posts or other space-restricted areas and are adjusted after the mechanical linkages are installed. For example, the cyclic control assemblies 162 and collective control assemblies 164 of FIG. 1B feature control posts that may be too small to house a rigging system such as rigging system 200. In such examples, access may be limited, and loss of hardware may result in a jammed control system (a potentially catastrophic failure).

Accordingly, teachings of certain embodiments recognize the capability to provide fine adjustment resolution in a positively-locked assembly with minimal hardware, thus reducing the potential for catastrophic failure due to foreign object damage (FOD). In addition, teachings of certain embodiments recognize the capability to provide fine adjustment resolution in a positively-locked assembly within confined spaces having limited access.

Figure 3A:
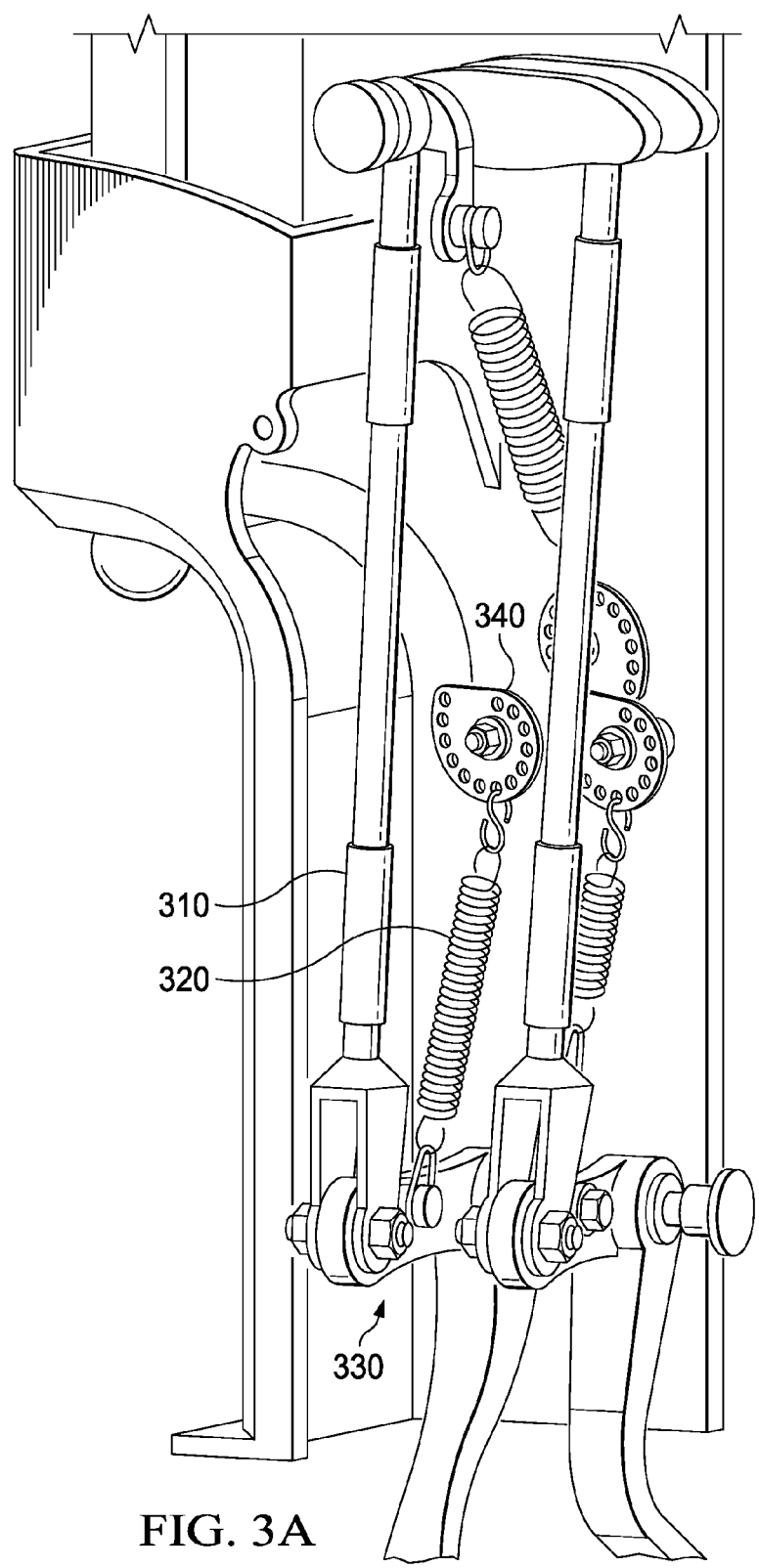
FIGS. 3A, 3B, and 3C show a rigging system according to one example embodiment that may be incorporated into the cockpit configuration of FIG. 1B.
Figure 3B:
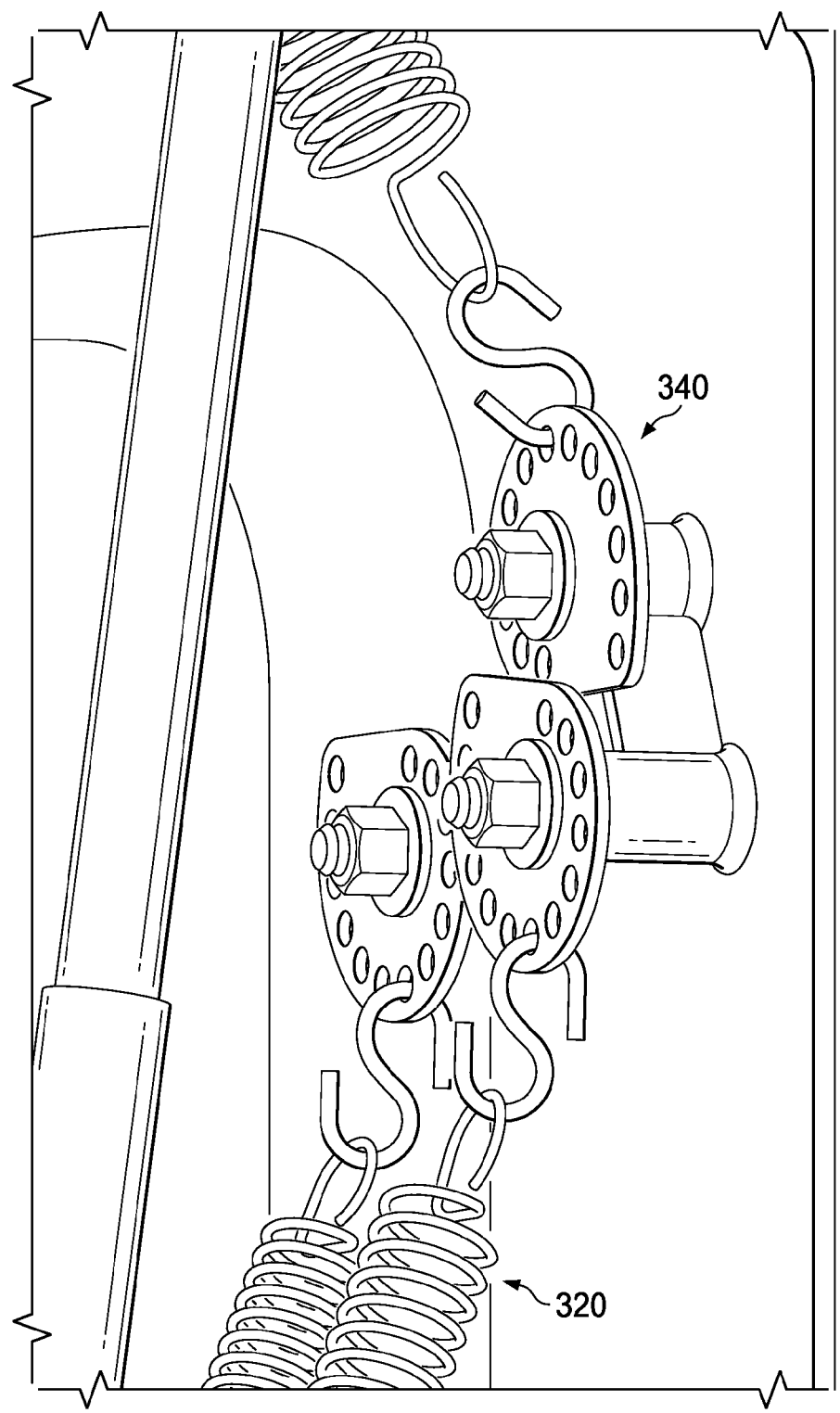
Figure 3C:
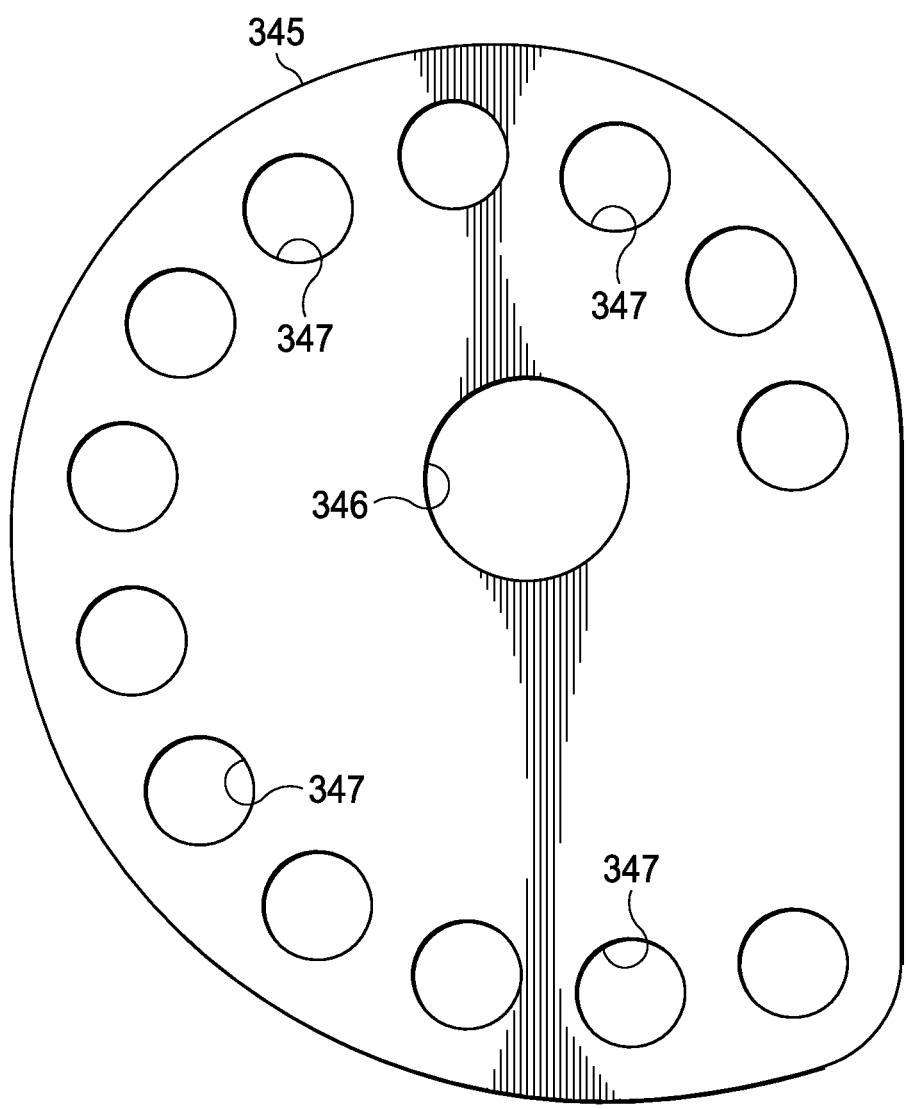

FIGS. 3A, 3B, and 3C show a rigging system 300 according to one example embodiment. In the example of rigging system 300, linkage 310 is rigged using a spring 320 positioned between a rigging member 330 and a spring-tension adjustment mechanism 340 having an adjustment plate 345. FIG. 3A shows a perspective view of rigging system 300, FIG. 3B shows a close-up perspective view of spring 320 attached to spring-tension adjustment device 340, and FIG. 3C shows a planar view of adjustment plate 345. Although the example of FIGS. 3A and 3B show three similar rigging systems 300, only one is referred to herein for clarity purposes.

In the example of FIGS. 3A-3C, spring tension adjustment mechanism 340 may be installed with traditional hardware (e.g., bolt, nut, and locking pin) as shown in FIG. 3B. The hardware may be torqued so that adjustment plate 345 can be turned using hand pressure and then locked into position. In some scenarios, adjustment plate 345 is not locked into position. For example, locking may not be necessary because spring 320 is collinear with the axis of rotation of plate 345. In this example, simply selecting a spring-attachment feature 347 provides sufficient "locking" because spring 320 pulls plate 345 into position and keeps plate 345 from rotating.

To adjust the spring attachment point, spring 320 may be unhooked from adjustment plate 345, and then adjustment plate 345 may be rotated to the desired position and then locked into place. Spring 320 may then be hooked onto adjustment plate 345 at the desired spring-attachment features 347.

Adjustment plate 345 may represent any suitable device for coupling one end of spring 320 to a fixed location. In the example of FIGS. 3A-3C, adjustment plate 345 is a solid material having several openings therethrough, including a first opening 346 and spring-attachment features 347.

In the example of FIGS. 3A-3C, first opening 346 represents both a rotation feature and an attachment feature. For example, adjustment plate 345 is coupled to a fixed location by positioning first opening 346 about an elongate shaft (e.g., a bolt). In this example, first opening 346 represents a rotation feature because it allows adjustment plate 345 to rotate about the elongate shaft. First opening 346 may define an axis of rotation in that it facilitates rotation of adjustment plate 345 about an axis corresponding to the elongate shaft.

In this example, first opening 346 may also represent an attachment feature because adjustment plate 345 is attached to the fixed location by tightening adjustment plate 345 against an elongate shaft that extends through first opening 346. For example, the nut shown in FIG. 3B may represent an adjustable fastener that is adjustable such that tightening the adjustable fastener restricts movement of adjustment plate 345 and loosening of the adjustable fastener permits rotation of adjustment plate 345 about the elongate shaft.

Adjustment plate 345 also features a plurality of spring-attachment features 347. Each spring-attachment feature 347 is configured to receive one end of spring 320. Each spring-attachment feature 347 is located at a different distance from first opening 346. In the example of FIG. 3C, spring-attachment features 347 are progressively offset from first opening 346 and arranged in sequential order of distance from first opening 346, starting with a first spring-attachment feature located closest to first opening 346 and ending with a last spring-attachment feature located farthest from first opening 346.

In operation, according to one example embodiment, one of the spring-attachment features 347 may be selected by rotating adjustment plate 345 about the elongate member. Teachings of certain embodiments recognize that spring tension adjustment mechanism 340 may be provided with mechanically locking hardware that does not need to be removed (only loosened) for spring adjustment. The friction in the joint and the tension in spring 320 may hold the adjustment plate 345 of spring tension adjustment mechanism 340 at the desired position. At adjustment, the progressively offset spring-attachment features 347 may allow for small changes in the spring ground point. In one example embodiment, an adjustment plate 345 having 13 spring-attachment features 347 may provide for +/−0.1875" adjustment with 13 adjustment increments (0.03" increments). Teachings of certain embodiments recognize that the ease of adjustment may allow the spring tension adjustment mechanism to be used in spaces with limited access.

In the example of FIG. 3C, spring-attachment features 347 are shown as holes in adjustment plate 345. Each hole is separated by a minimum distance from each other such that none of the holes are contiguous with each other. Teachings of certain embodiments recognize that providing non-contiguous holes may prevent spring 320 from slipping from one spring-attachment position to a different spring-attachment position.

Although the example of FIGS. 2-4 show an adjustment plate having multiple adjustment holes, teachings of certain embodiments recognize that other configurations may be available. For example, slots or other attachment locations may be used instead of holes.

Modifications, additions, or omissions may be made to the systems and apparatuses described herein without departing from the scope of the invention. The components of the systems and apparatuses may be integrated or separated. Moreover, the operations of the systems and apparatuses may be performed by more, fewer, or other components. The methods may include more, fewer, or other steps. Additionally, steps may be performed in any suitable order.

Although several embodiments have been illustrated and described in detail, it will be recognized that substitutions and alterations are possible without departing from the spirit and scope of the present invention, as defined by the appended claims.

To aid the Patent Office, and any readers of any patent issued on this application in interpreting the claims appended hereto, applicants wish to note that they do not intend any of the appended claims to invoke paragraph 6 of 35 U.S.C. §112 as it exists on the date of filing hereof unless the words "means for" or "step for" are explicitly used in the particular claim.

What is claimed is:

1. A rotorcraft, comprising:
   a body;
   a power train coupled to the body and comprising a power source and a drive shaft coupled to the power source;
   a rotor system coupled to the power train and comprising a plurality of rotor blades;
   a pilot input device operable to receive inputs from a pilot; and
   a flight control assembly in communication with the rotor system and the pilot input device, the flight control assembly comprising:
      a plurality of mechanical members in communication with the rotor system and the pilot input device;
      a spring coupled between one of the plurality of mechanical members and an attachment point;
      a spring-tension adjustment device coupled to the spring, the spring-tension adjustment device comprising:
         a rotation feature defining a first axis of rotation; and
         a plurality of apertures, each aperture configured to receive one of the first end or the second end of the spring, each aperture being located at a different distance from the first axis of rotation.

2. The rotorcraft of claim 1, wherein the plurality of apertures are arranged in sequential order of distance from the first axis of rotation, starting with a first aperture located closest to the first axis of rotation and ending with a last aperture located farthest from the first axis of rotation.

3. The rotorcraft of claim 1, wherein each aperture is separated by a minimum distance from each other.

4. The rotorcraft of claim 1, wherein:
   the spring-tension adjustment device comprises a solid material; and
   the rotation feature comprises a first opening through the solid material.

5. The rotorcraft of claim 4, wherein portions of the solid material separate each aperture from each other such that none of the plurality of apertures are contiguous with another aperture.

6. The rotorcraft of claim 1, wherein the spring is removably coupled to the spring-tension adjustment device such that the spring may be removed from a first of the plurality of apertures and attached to a different second of the apertures.

7. The rotorcraft of claim 1, wherein the spring-adjustment device is coupled to the attachment point or the one of the plurality of mechanical members.

8. The rotorcraft of claim 1, wherein:
   the attachment point comprises an elongate shaft; and
   the rotation feature comprises an opening through a solid material such that the solid material is configured to rotate about the elongate shaft.

9. The rotorcraft of claim 8, further comprising an adjustable fastener coupling the spring-tension adjustment device to the elongate shaft at the rotation feature, the adjustable fastener adjustable such that tightening the adjustable fastener restricts movement of the spring-tension adjustment device and loosening of the adjustable fastener permits rotation of the spring-tension adjustment device about the elongate shaft.

10. A flight control assembly comprising:
   a plurality of mechanical members in communication with a pilot input device;
   a spring coupled between one of the plurality of mechanical members and an attachment point;

a spring-tension adjustment device coupled to the spring, the spring-tension adjustment device comprising:
  a rotation feature defining a first axis of rotation; and
  a plurality of apertures, each aperture configured to receive one of the first end or the second end of the spring, each aperture being located at a different distance from the first axis of rotation.

11. The flight control assembly of claim 10, wherein the plurality of apertures are arranged in sequential order of distance from the first axis of rotation, starting with a first aperture located closest to the first axis of rotation and ending with a last aperture located farthest from the first axis of rotation.

12. The flight control assembly of claim 10, wherein:
  the spring-tension adjustment device comprises a solid material; and
  the rotation feature comprises a first opening through the solid material.

13. The flight control assembly of claim 10, wherein the spring is removably coupled to the spring-tension adjustment device such that the spring may be removed from a first of the plurality of apertures and attached to a different second of the plurality of apertures.

14. The flight control assembly of claim 10, wherein:
  the attachment point comprises an elongate shaft; and
  the rotation feature comprises an opening through a solid material such that the solid material is configured to rotate about the elongate shaft.

15. The flight control assembly of claim 14, further comprising an adjustable fastener coupling the spring-tension adjustment device to the elongate shaft at the rotation feature, the adjustable fastener adjustable such that tightening the adjustable fastener restricts movement of the spring-tension adjustment device and loosening of the adjustable fastener permits rotation of the spring-tension adjustment device about the elongate shaft.

16. A spring tension adjustment device for adjusting tension in a spring in an aircraft, the spring tension adjustment device comprising:
  a rotation feature defining a first axis of rotation in the aircraft; and
  a plurality of apertures, each aperture configured to receive one end of a spring, each aperture being located at a different distance from the first axis of rotation.

17. The spring tension adjustment device of claim 16, wherein the plurality of apertures are arranged in sequential order of distance from the first axis of rotation, starting with a first aperture located closest to the first axis of rotation and ending with a last aperture located farthest from the first axis of rotation.

18. The spring tension adjustment device of claim 16, wherein:
  the spring-tension adjustment device comprises a solid material; and
  the rotation feature comprises a first opening through the solid material.

19. The spring tension adjustment device of claim 16, wherein the spring is removably coupled to the spring-tension adjustment device such that the spring may be removed from a first of the plurality of spring-attachment features and attached to a different second of the spring-attachment features.

20. The spring tension adjustment device of claim 16, further comprising an adjustable fastener coupling the spring-tension adjustment device to an attachment point proximate to the rotation feature, the adjustable fastener adjustable such that tightening the adjustable fastener restricts movement of the spring-tension adjustment device and loosening of the adjustable fastener permits rotation of the spring-tension adjustment device about the elongate shaft.

* * * * *